US012193512B2

(12) United States Patent
Silvestrini et al.

(10) Patent No.: US 12,193,512 B2
(45) Date of Patent: Jan. 14, 2025

(54) CARTRIDGE FOR AN AEROSOL-GENERATING SYSTEM WITH HEATER PROTECTION

(71) Applicant: Altria Client Services LLC, Richmond, VA (US)

(72) Inventors: Patrick Charles Silvestrini, Neuchatel (CH); Ihar Nikolaevich Zinovik, Peseux (CH); Keethan Dasnavis Fernando, Neuchatel (CH)

(73) Assignee: Altria Client Services LLC, Richmond, VA (US)

( * ) Notice: Subject to any disclaimer, the term of this patent is extended or adjusted under 35 U.S.C. 154(b) by 20 days.

(21) Appl. No.: 18/298,686

(22) Filed: Apr. 11, 2023

(65) Prior Publication Data

US 2023/0247725 A1 Aug. 3, 2023

Related U.S. Application Data

(63) Continuation of application No. 16/919,635, filed on Jul. 2, 2020, now Pat. No. 11,641,696, which is a (Continued)

(30) Foreign Application Priority Data

Jul. 25, 2016 (EP) .................................... 16180983

(51) Int. Cl.
*A24F 40/42* (2020.01)
*A24F 40/46* (2020.01)
(Continued)

(52) U.S. Cl.
CPC ............ *A24F 40/485* (2020.01); *A24F 40/42* (2020.01); *A24F 40/46* (2020.01); *F22B 1/284* (2013.01);
(Continued)

(58) Field of Classification Search
CPC ........ A24F 40/485; A24F 40/46; A24F 40/42; A24F 40/40; A24F 40/10; H05B 1/0277; H05B 3/44
See application file for complete search history.

(56) References Cited

U.S. PATENT DOCUMENTS 10,327,477 B2 * 6/2019 Silvestrini ............... F22B 1/284
10,701,983 B2 * 7/2020 Silvestrini ............... A24F 40/42
(Continued)

FOREIGN PATENT DOCUMENTS

CN 203087525 U 7/2013
CN 104602552 A 5/2015
(Continued)

OTHER PUBLICATIONS

Board Opinion dated Dec. 28, 2023 issued in related Chinese patent application No. 201780043489.2.
(Continued)

*Primary Examiner* — Hae Moon Hyeon
(74) *Attorney, Agent, or Firm* — Harness, Dickey & Pierce, P.L.C.

(57) ABSTRACT

A cartridge for an aerosol-generating system includes a storage container containing a supply of an aerosol-forming substrate, a fluid permeable heating element positioned across an opening in the storage container, a protective cover coupled to the storage container and covering the fluid permeable heating element, at least one air inlet, at least one air outlet, and an airflow path from the at least one air inlet to the at least one air outlet. The protective cover is configured such that a portion of the airflow path is between the protective cover and the fluid permeable heating element.

20 Claims, 7 Drawing Sheets

Related U.S. Application Data continuation of application No. 16/449,870, filed on Jun. 24, 2019, now Pat. No. 10,701,983, which is a continuation of application No. 15/658,816, filed on Jul. 25, 2017, now Pat. No. 10,327,477, which is a continuation of application No. PCT/EP2017/065295, filed on Jun. 21, 2017.

(51) Int. Cl.

| | |
|---|---|
| ***A24F 40/485*** | (2020.01) |
| ***F22B 1/28*** | (2006.01) |
| ***H05B 1/02*** | (2006.01) |
| ***H05B 3/44*** | (2006.01) |
| *A24F 40/10* | (2020.01) |

(52) U.S. Cl.

CPC ............. *H05B 1/0277* (2013.01); *H05B 3/44* (2013.01); *A24F 40/10* (2020.01)

(56) References Cited

U.S. PATENT DOCUMENTS

| | | | | |
|---|---|---|---|---|
| 10,709,173 | B2 * | 7/2020 | Monsees | A24F 40/42 |
| 11,297,877 | B2 * | 4/2022 | Zinovik | A61M 15/0016 |
| 11,641,696 | B2 * | 5/2023 | Silvestrini | A24F 40/46 131/329 |
| 11,653,699 | B2 * | 5/2023 | Blattler | A24F 40/485 131/273 |
| 2013/0213419 | A1 | 8/2013 | Tucker et al. | |
| 2014/0060554 | A1 | 3/2014 | Collett et al. | |
| 2014/0202454 | A1 | 7/2014 | Buchberger | |
| 2014/0305454 | A1 | 10/2014 | Rinker et al. | |
| 2015/0040929 | A1 | 2/2015 | Hon | |
| 2015/0090279 | A1 | 4/2015 | Chen | |
| 2015/0136156 | A1 * | 5/2015 | Liu | A24F 40/50 131/329 |
| 2016/0029698 | A1 | 2/2016 | Xiang | |
| 2016/0113326 | A1 | 4/2016 | Li et al. | |
| 2016/0249681 | A1 | 9/2016 | Liu | |
| 2016/0309785 | A1 | 10/2016 | Holtz | |
| 2016/0309786 | A1 | 10/2016 | Holtz et al. | |
| 2016/0338410 | A1 | 11/2016 | Batista et al. | |
| 2016/0345629 | A1 | 12/2016 | Mironov | |
| 2016/0345630 | A1 | 12/2016 | Mironov et al. | |
| 2017/0027226 | A1 | 2/2017 | Mironov et al. | |
| 2017/0215478 | A1 | 8/2017 | Harrison et al. | |
| 2017/0325505 | A1 | 11/2017 | Force et al. | |
| 2017/0340012 | A1 | 11/2017 | Mironov et al. | |
| 2017/0347401 | A1 | 11/2017 | Mironov et al. | |
| 2017/0354184 | A1 | 12/2017 | Mironov et al. | |
| 2017/0360093 | A1 | 12/2017 | Fernando | |
| 2019/0124986 | A1 * | 5/2019 | Blattler | A24F 40/42 |
| 2019/0230986 | A1 * | 8/2019 | Zinovik | F16K 7/06 |
| 2022/0046988 | A1 * | 2/2022 | Blattler | A24F 40/485 |

FOREIGN PATENT DOCUMENTS

| | | | |
|---|---|---|---|
| EP | 3162403 | A1 | 5/2017 |
| EP | 3435795 | A1 | 2/2019 |
| KR | 10-0933516 | B1 | 12/2009 |
| KR | 2013-0036585 | A | 4/2013 |
| KR | 2013-0127412 | A | 11/2013 |
| RU | 2014147485 | A | 6/2016 |
| WO | WO-03103387 | A2 | 12/2003 |
| WO | WO-2006/124757 | A2 | 11/2006 |
| WO | WO-2014/037794 | A2 | 3/2014 |
| WO | WO-2015/043132 | A1 | 4/2015 |
| WO | WO-2015/066127 | A1 | 5/2015 |
| WO | WO-2015/117700 | A1 | 8/2015 |
| WO | WO-2015/117702 | A1 | 8/2015 |
| WO | WO-2015/117703 | A1 | 8/2015 |
| WO | WO-2015/117704 | A1 | 8/2015 |
| WO | WO-2015/117705 | A2 | 8/2015 |
| WO | WO-2015117701 | A1 | 8/2015 |
| WO | WO-2016/005533 | A1 | 1/2016 |
| WO | WO-2016/092261 | A1 | 6/2016 |
| WO | WO-2016/096745 | A1 | 6/2016 |
| WO | WO-2017/167512 | A1 | 10/2017 |
| WO | WO-2017/207320 | A1 | 12/2017 |
| WO | WO-2018/019477 | A1 | 2/2018 |

OTHER PUBLICATIONS

Office Action dated Aug. 1, 2023 issued in related Brazilian patent application No. 1120190003819.

European Search Report for European Patent Application No. 16180983.5 Dated Feb. 7, 2017.

Written Opinion for Application No. PCT/EP2017/065295 dated Oct. 18, 2017.

International Search Report for corresponding Application No. PCT/EP2017/065295 dated Oct. 19, 2017.

International Preliminary Report on Patentability for corresponding International Application No. PCT/EP2017/065295, dated Jan. 29, 2019.

GC Examination Report for corresponding Application No. GC 2017-33675, dated Mar. 27, 2019.

GC Examination Report for corresponding Application No. 33675, dated Oct. 27, 2019.

Kazakh Notice of Allowance for corresponding Application No. 2019/0114.1, dated Mar. 12, 2020, English translation thereof.

European Notice of Allowance for corresponding Application No. 17732874.7, dated Mar. 6, 2020.

Russian Decision to Grant and Search Report for corresponding Application No. 2019104871, dated Jul. 16, 2020.

Notice of Allowance dated Apr. 15, 2021 issued in corresponding Japanese Patent Application No. 2019-503404.

European Notice of Opposition dated May 6, 2021 for corresponding European Application No. 17732874.7.

Collins Dictionary "Opening Definition—Collins English Dictionary".

Collins Dictionary "Cover Definition—Collins English Dictionary".

Chinese Office Action dated Apr. 25, 2021 for corresponding Chinese Application No. 201780043489.2, and English-language translation thereof.

Substantive Examination Report of the Philippines dated May 28, 2021 for corresponding Application No. 1-2018-502505.

Notice of Allowance dated Jun. 18, 2021 issued in corresponding Mexican Patent Application No. MX/a/2019/000718.

Notice of Allowance dated Jun. 4, 2021 issued in corresponding Ukrainian Patent Application No. A201811734.

Israeli Office Action dated Sep. 12, 2021 for corresponding Israeli Application No. 263374, and English-language translation thereof.

Malaysian Office Action dated Oct. 15, 2021 for corresponding Malaysian Application No. 2018002197.

Office Action dated Sep. 27, 2021 issued in corresponding Brazilian patent application No. 112019000381.9.

European Summons to Oral Proceedings dated Feb. 23, 2022 for corresponding European Application No. 17732874.4.

Chinese Office Action dated Feb. 9, 2022 for corresponding Chinese Application No. 201780043489.2, and English-language translation thereof.

Israeli Notice of Allowance dated Feb. 10, 2022 for corresponding Israeli application No. 263374.

English-language translation of Malaysian Office Action dated Jul. 27, 2022 for corresponding Malaysian Application No. PI 2018002197.

Korean Office Action dated Jul. 28, 2022 for corresponding Korean Application No. 2019-7001898, and English-language translation thereof.

Brief Communication on Oral Proceedings on letter from the Opponent dated Nov. 22, 2022 for corresponding Application No. 17732874.7.

Interlocutory decision in Opposition proceedings dated Feb. 28, 2023 issued in related European patent application No. 17732874.7.

Notice of Allowance dated Jan. 26, 2023 issued in related Korean patent application No. 10-2019-7001898.

(56) References Cited

OTHER PUBLICATIONS

Office Action dated Apr. 29, 2024 issued in Chinese Patent Application No. 201780043489.2.
Letter from the Opponent dated Nov. 16, 2023 issued in related European patent No. 3487235.
Notice of Allowance dated Oct. 9, 2024 issued in Philippines Patent Application No. 1-2018-502505.

* cited by examiner

CARTRIDGE FOR AN AEROSOL-GENERATING SYSTEM WITH HEATER PROTECTION

CROSS-REFERENCE TO RELATED APPLICATIONS

This application is a continuation application of U.S. application Ser. No. 16/919,635, filed Jul. 2, 2020, which is a continuation application of U.S. application Ser. No. 16/449,870, filed Jun. 24, 2019, which is a continuation application of U.S. application Ser. No. 15/658,816, filed Jul. 25, 2017, which is a continuation of, and claims priority to, international application no. PCT/EP2017/065295, filed on Jun. 21, 2017, and further claims priority under 35 U.S.C. § 119 to European Patent Application No. 16180983.5, filed Jul. 25, 2016, the entire contents of each of which are incorporated herein by reference.

BACKGROUND

Field

At least one example embodiment relates to aerosol-generating systems, such as handheld electrically operated aerosol-generating systems. At least one example embodiment relates to cartridges for aerosol-generating systems, containing a supply of an aerosol-forming substrate and a heater assembly.

Description of Related Art

Handheld electrically operated aerosol-generating systems may consist of a device portion comprising a battery and control electronics, and a cartridge portion that may contain a supply of an aerosol-forming substrate held in a storage portion. The aerosol-generating system may also include an electrically operated heater assembly acting as a vaporiser. The heater assembly may comprise a fluid permeable heating element that is in contact with the aerosol-forming substrate held in the storage portion.

SUMMARY

At least one example embodiment relates to a cartridge for an aerosol-generating system.

In at least one example embodiment, a cartridge for an aerosol-generating system includes a storage container configured to contain a supply of an aerosol-forming substrate, a fluid permeable heating element positioned across an opening in the storage container, a protective cover coupled to the storage container and configured to cover the fluid permeable heating element, at least one air inlet, at least one air outlet, and an airflow path from the at least one air inlet to the at least one air outlet. The protective cover is configured such that a portion of the airflow path is between the protective cover and the fluid permeable heating element.

In at least one example embodiment, the protective cover forms part of an external surface of the cartridge.

In at least one example embodiment, the cartridge further comprises a device end configured to connect to a device portion, and a mouthpiece end opposite to the device end. The protective cover is positioned at the device end of the cartridge.

In at least one example embodiment, the protective cover is between the device portion and the fluid permeable heating element when the cartridge is connected to the device portion.

In at least one example embodiment, the cartridge further includes electrical contact pads connected to the fluid permeable heating element. The protective cover includes at least one contact opening that exposes the electrical contact pads.

In at least one example embodiment, the at least one air inlet is in the protective cover.

In at least one example embodiment, the airflow path comprises a sharp bend between the heating element and the air outlet.

In at least one example embodiment, the cartridge further comprises a mouthpiece portion. The mouthpiece portion comprises a portion of an external housing of the cartridge.

In at least one example embodiment, the protective cover is coupled to at least one of an external housing of the cartridge or the storage container by a mechanical interlock.

In at least one example embodiment, the fluid permeable heating element comprises a plurality of filaments forming a mesh.

In at least one example embodiment, the protective cover retains the heating element to the storage container.

At least one example embodiment relates to an aerosol-generating system.

In at least one example embodiment, an aerosol-generating system comprises a cartridge and a device portion. The cartridge includes a storage container configured to contain a supply of an aerosol-forming substrate, a fluid permeable heating element positioned across an opening in the storage container, a protective cover coupled to the storage container and configured to cover the fluid permeable heating element, at least one air inlet, at least one air outlet, and an airflow path from the at least one air inlet to the at least one air outlet. The protective cover is configured such that a portion of the airflow path is between the protective cover and the fluid permeable heating element. The device portion includes a power supply, and control electronics. The cartridge is configured to connect to the device portion. When the cartridge is connected to the device portion, the fluid permeable heater element is electrically connected to the power supply.

In at least one example embodiment, the device portion further comprises at least one electrical contact element configured to provide an electrical connection to the fluid permeable heating element when the device portion is connected to the cartridge. The electrical contact element extends through a contact opening in the protective cover.

In at least one example embodiment, the system is a handheld aerosol-generating system.

BRIEF DESCRIPTION OF THE DRAWINGS

Example embodiments will now be described, by way of example only, with reference to the accompanying drawings.

Figure 1:
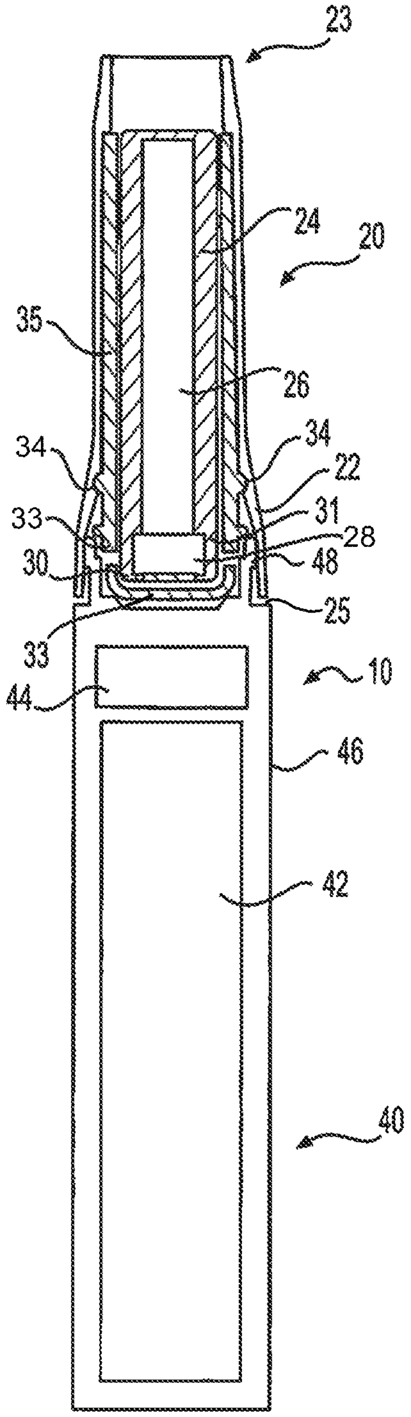
FIG. 1 is a simplified cross-section of an aerosol-generating system in accordance with at least one example embodiment.

FIG. **3*a* is a perspective view of the cartridge of FIG. 1** according to at least one example embodiment.

FIG. **3*b* is a perspective view of the device portion of FIG. 1** according to at least one example embodiment.

Figure 3A:
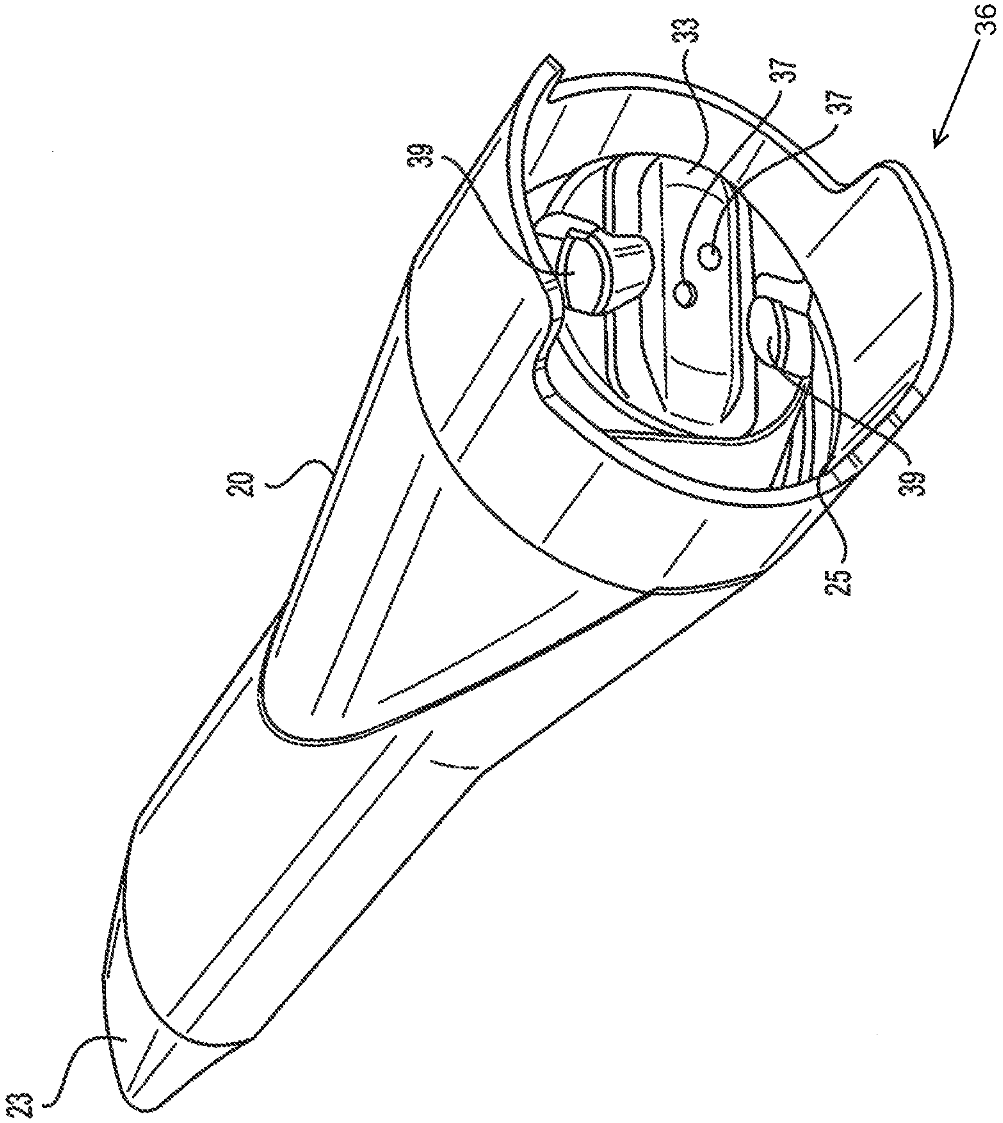
Figure 3B:
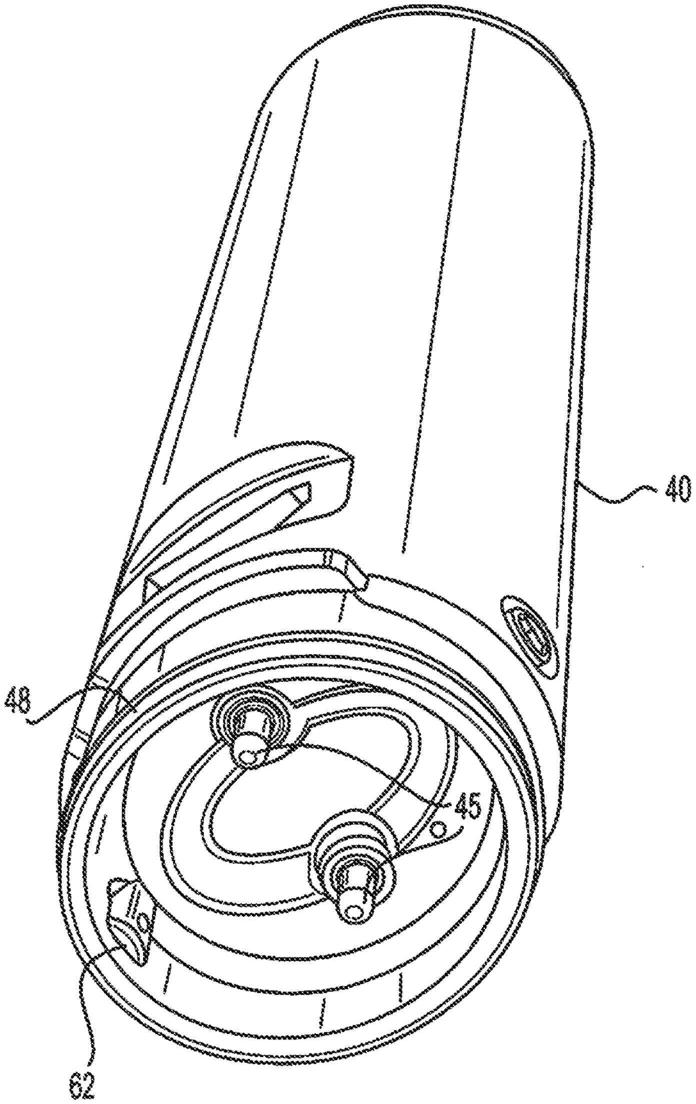
Figure 4:
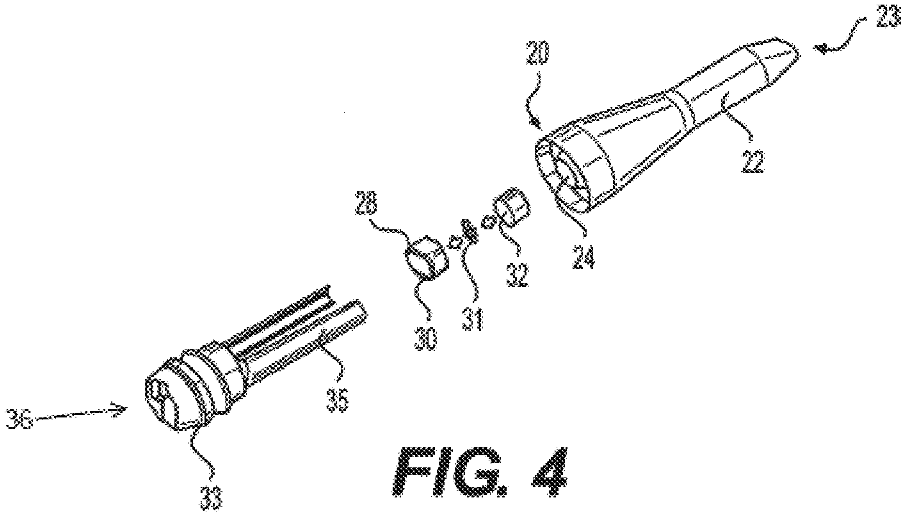

FIG. 4 is an exploded view of a cartridge of the type shown in FIG. 3 according to at least one example embodiment.

Figure 5:
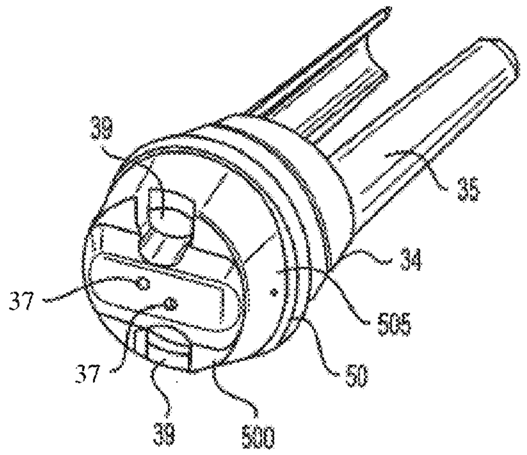

FIG. 5 is a perspective view of the protective cover of FIG. 3 according to at least one example embodiment.

Figure 6:
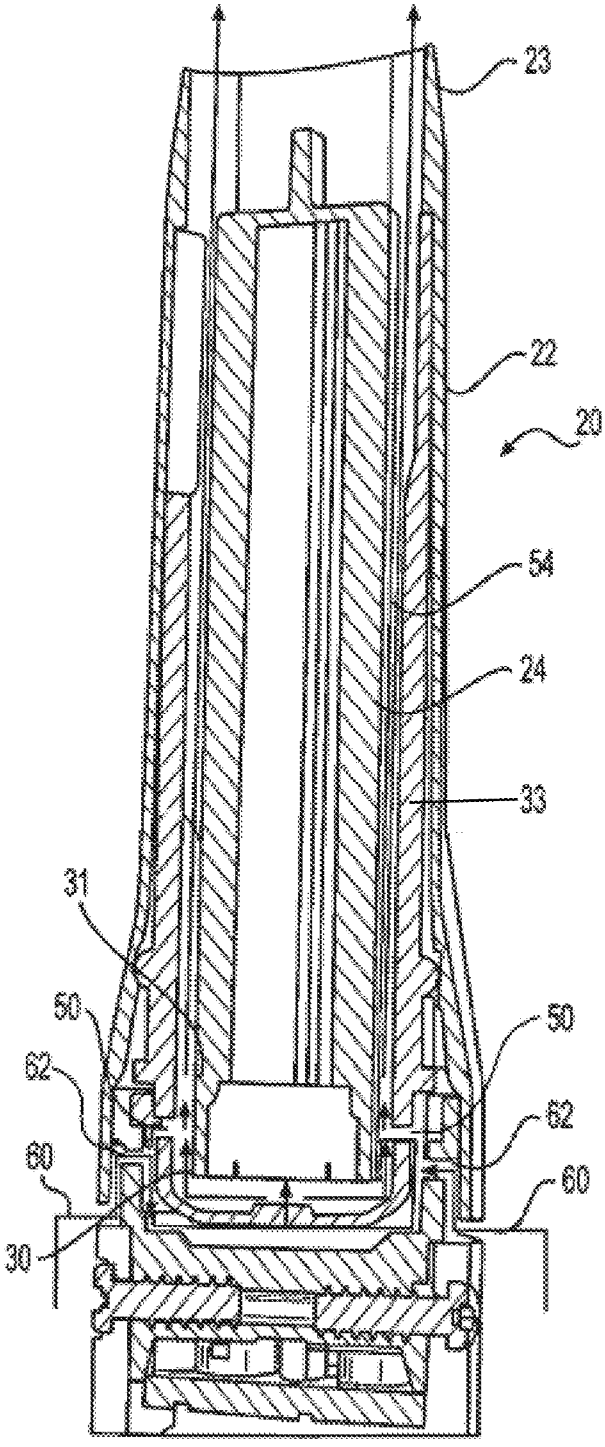

FIG. 6 illustrates the airflow through a system including the cartridge shown in FIG. 3 according to at least one example embodiment.

Figure 7:
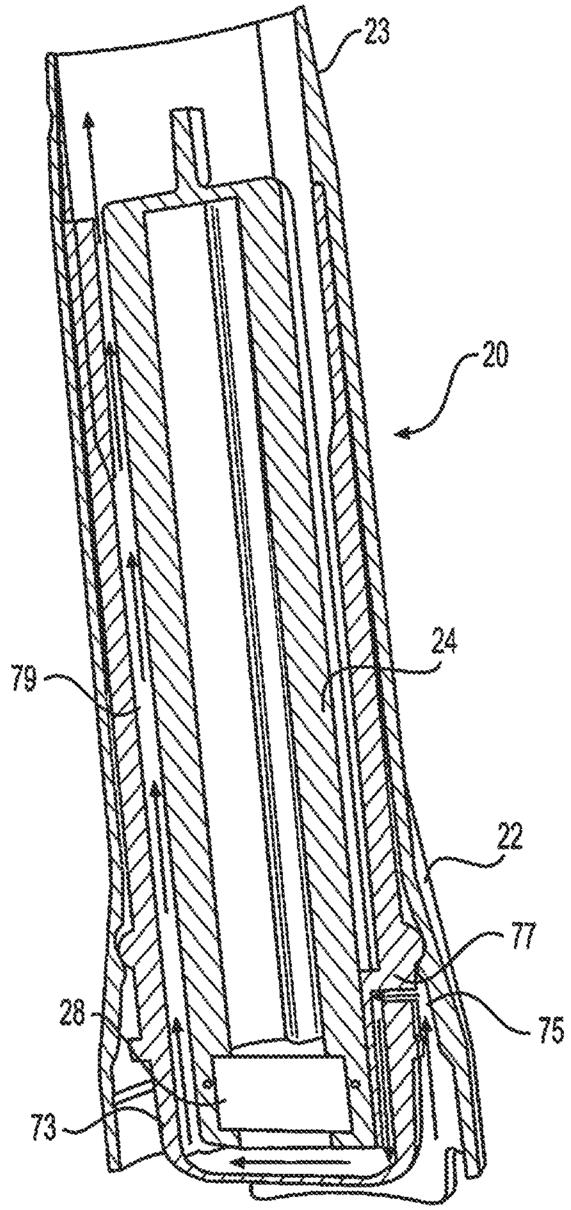

FIG. 7 illustrates an alternative airflow path in accordance with at least one example embodiment.

DETAILED DESCRIPTION

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In at least one example embodiment, a cartridge for an aerosol-generating system includes a storage container containing a supply of aerosol-forming substrate, a fluid permeable heating element positioned across an opening in the storage container, a protective cover coupled to the storage container and covering the fluid permeable heating element, at least one air inlet, at least one air outlet, and an airflow path from the at least one air inlet to the at least one air outlet. The protective cover is configured such that a portion of the airflow path is between the protective cover and the fluid permeable heating element.

The protective cover may form part of an external surface of the cartridge. The cartridge may be configured to connect to a device portion of the aerosol-generating system. The device portion may comprise a battery and control electronics. The cartridge may comprise a device end configured to connect to the device portion and mouthpiece end opposite to the device end. The protective cover may be at the device end of the cartridge. The protective cover may be positioned between the device portion and the heating element when the cartridge is connected to the device portion.

The fluid permeable heating element may be part of a heater assembly in the cartridge. The heater assembly may comprise electrical contact pads connected to the fluid permeable heating element. The protective cover may comprise one or more contact openings that expose the electrical contact pads. The contact openings in the protective cover allow for electrical connection to be made between the device portion and the heater assembly. The contact openings may be positioned on opposite sides of the opening in the storage container.

The cartridge may comprise a mouthpiece portion. Aerosol generated in the cartridge may exit the cartridge via the mouthpiece portion. In at least one example embodiment, a separate mouthpiece portion may be provided or a mouthpiece portion may be provided as part of the device portion.

The cartridge may comprise an external housing. The mouthpiece portion may comprise part of the external housing of the cartridge. The external housing may be generally tubular. The external housing may comprise the air outlet at a mouthpiece end. The external housing may comprise a connecting portion at the device end of the cartridge. The connecting portion may comprise a mechanical interlock structure, such as a snap fitting or a screw fitting, configured to engage a corresponding interlock structure on a device portion.

The at least one air inlet may be provided in the protective cover. Alternatively, the at least one air inlet may be provided in the external housing or between the external housing and the protective cover.

The airflow path may be configured to direct air onto the fluid permeable heating element. Alternatively, or in addition, the airflow path may be configured to direct air across the fluid permeable heating element. The airflow path may comprise a sharp bend, for example a bend of more than 45 degrees, between the heating element and the air outlet. The sharp bend may be defined by a wall of the protective cover. The airflow path may comprise a substantially U-shaped portion. A sharp bend in the airflow path removes very large droplets from the aerosol.

The protective cover may effectively isolate the heating element and airflow path from the other electrical components of the system. The protective cover advantageously is shaped to provide a barrier between the airflow path and the electrical contact pads of the heater assembly. In this way, the protective cover reduces the problem of liquid from the storage container and condensation from the airflow path interfering with the electrical components of the system. In particular, by providing a barrier between the airflow path and the contact pads and electrical contact elements of the device portion, the possibility of aerosol on the contact pads and contaminating the contact surfaces of the contact pads and the contact elements is significantly reduced.

In addition, to further reduce the possibility of leaked or condensed liquid from within the airflow path escaping and contaminating other components of the system, a layer of liquid retention material may be provided on an interior of the protective cover or on an exterior of the storage container, to absorb liquid that has condensed within the airflow path.

The protective cover may be formed from any suitable material. The protective cover may be formed from a mouldable plastics material. In one embodiment, the protective cover is formed from liquid crystal polymer (LCP).

The protective cover may comprise a cap portion covering the heating element. The protective cover may comprise one or more arms connected to the cap portion and extending along a length of the storage container towards the mouthpiece end of the cartridge. An airflow path may be defined between the storage container and the one or more arms of the protective cover.

The protective cover may be coupled to the external housing of the cartridge or to the storage container by a mechanical interlock, such as a snap fitting. Alternatively, another form of fixing may be used, such as welding or adhesive. The protective cover may act to retain the heater assembly to the storage container.

The storage container and the external housing may be fixed to each other by a mechanical fixing, or by welding or adhesive. Advantageously, the storage container and external housing may be integrally formed. The external housing and the storage container may be formed form a mouldable plastics material, such as polypropylene (PP) or polyethylene terephthalate (PET).

The heater assembly may comprise a heater cap, the heater cap comprising a hollow body with first and second heater cap openings, wherein the first heater cap opening is on an opposite end of the hollow body to the second heater cap opening. The fluid permeable heating element may be substantially flat. The heating element may be mounted on the heater cap such that the heating element extends across the first heater cap opening. The heater cap may be coupled to an open end of the storage container so that the heating element extends across the open end of the storage container.

As used herein, "electrically conductive" means formed from a material having a resistivity of 1×10-4 Ohm meter, or less. As used herein, "electrically insulating" means formed from a material having a resistivity of 1×104 Ohm meter or more. As used herein, "fluid permeable" in relation to a heater assembly means that the aerosol-forming substrate, in a gaseous phase and possibly in a liquid phase, can readily pass through the heating element of the heater assembly.

The heater assembly may comprise a substantially flat heating element to allow for simple manufacture. Geometrically, the term "substantially flat" electrically conductive heating element is used to refer to an electrically conductive arrangement of filaments that is in the form of a substantially two dimensional topological manifold. Thus, the substantially flat electrically conductive heating element extends in two dimensions along a surface substantially more than in a third dimension. In particular, the dimensions of the substantially flat heating element in the two dimensions within the surface is at least five times larger than in the third dimension, normal to the surface. An example of a substantially flat heating element is a structure between two substantially imaginary parallel surfaces, wherein the distance between these two imaginary surfaces is substantially smaller than the extension within the surfaces. In some embodiments, the substantially flat heating element is planar. In other embodiments, the substantially flat heating element is curved along one or more dimensions, for example forming a dome shape or bridge shape.

The term "filament" is used throughout the specification to refer to an electrical path arranged between two electrical contacts. A filament may arbitrarily branch off and diverge into several paths or filaments, respectively, or may converge from several electrical paths into one path. A filament may have a round, square, flat or any other form of cross-section. A filament may be arranged in a straight or curved manner.

The heating element may be an array of filaments, for example arranged parallel to each other. In at least one example embodiment, the filaments may form a mesh. The mesh may be woven or non-woven. The mesh may be formed using different types of weave or lattice structures. Alternatively, the electrically conductive heating element consists of an array of filaments or a fabric of filaments. The mesh, array or fabric of electrically conductive filaments may also be characterized by its ability to retain liquid.

In at least one example embodiment, a substantially flat heating element may be constructed from a wire that is formed into a wire mesh. In at least one example embodiment, the mesh has a plain weave design. In at least one example embodiment, the heating element is a wire grill made from a mesh strip.

The electrically conductive filaments may define interstices between the filaments and the interstices may have a width of about 10 micrometres to about 100 micrometres. In at least one example embodiment, the filaments give rise to capillary action in the interstices, so that in use, liquid to be vaporized is drawn into the interstices, increasing the contact area between the heating element and the liquid aerosol-forming substrate.

The electrically conductive filaments may form a mesh of size between 60 and 240 filaments per centimetre (+/−10 percent). In at least one example embodiment, the mesh density ranges from about 100 to about 140 filaments per centimetres (+/−10 percent). In at least one example embodiment, the mesh density is about 115 filaments per centimetre. The width of the interstices may range from about 100 micrometres to about 25 micrometres, from about 80 micrometres to about 70 micrometres, or may be about 74 micrometres. The percentage of open area of the mesh, which is the ratio of the area of the interstices to the total area of the mesh may range from about 40 percent to about 90 percent, from about 85 percent to about 80 percent, or may be about 82 percent.

The electrically conductive filaments may have a diameter of about 8 micrometres to about 100 micrometres, from about 10 micrometres to about 50 micrometres, from about 12 micrometres to about 25 micrometres, or be about 16 micrometres. The filaments may have a round cross section or may have a flattened cross-section.

The area of the mesh, array or fabric of electrically conductive filaments may be small, for example less than or equal to about 50 square millimetres, less than or equal to about 25 square millimetres, or about 15 square millimetres. The size is chosen such to incorporate the heating element into a handheld system. Sizing of the mesh, array or fabric of electrically conductive filaments less or equal than about 50 square millimetres reduces the amount of total power required to heat the mesh, array or fabric of electrically conductive filaments while still ensuring sufficient contact of the mesh, array or fabric of electrically conductive filaments to the liquid aerosol-forming substrate. The mesh, array or fabric of electrically conductive filaments may, for example, be rectangular and have a length ranging from about 2 millimetres to about 10 millimetres and a width ranging from about 2 millimetres to about 10 millimetres. In at least one example embodiment, the mesh has dimensions of about 5 millimetres by about 3 millimetres.

The filaments of the heating element may be formed from any material with suitable electrical properties. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group.

Examples of suitable metal alloys include stainless steel, constantan, nickel-, cobalt-, chromium-, aluminum-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminum based alloys and iron-manganese-aluminum based alloys. Timetal® is a registered trade mark of Titanium Metals Corporation. The filaments may be coated with one or more insulators. In at least one example embodiment, materials for the electrically conductive filaments are stainless steel and graphite, or 300 series stainless steel like AISI 304, 316, 304L, 316L. In at least one example embodiment, the electrically conductive heating element may comprise combinations of the above materials. A combination of materials may be used to improve the control of the resistance of the substantially flat heating element. In at least one example embodiment, materials with a high intrinsic resistance may be combined with materials with a low intrinsic resistance.

In at least one example embodiment, the filaments are made of wire. In at least one example embodiment, the wire is made of metal. In at least one example embodiment, the wire is made of stainless steel.

The electrical resistance of the mesh, array or fabric of electrically conductive filaments of the heating element may range from about 0.3 Ohms to about 4 Ohms. In at least one example embodiment, the electrical resistance is equal or greater than about 0.5 Ohms. In at least one example embodiment, the electrical resistance of the mesh, array or fabric of electrically conductive filaments ranges from about 0.6 Ohms to about 0.8 Ohms, and may be about 0.68 Ohms. The electrical resistance of the mesh, array or fabric of electrically conductive filaments is at least an order of magnitude, or at least two orders of magnitude, greater than the electrical resistance of electrically conductive contact areas. This ensures that the heat generated by passing current through the heating element is localized to the mesh or array of electrically conductive filaments. A low overall resistance for the heating element is useful if the system is powered by a battery. A low resistance, high current system allows for the delivery of high power to the heating element. This allows the heating element to heat the electrically conductive filaments to a desired temperature quickly.

The storage container or cap may hold a liquid retention material for holding a liquid aerosol-forming substrate. The liquid retention material may be a foam, and sponge of collection of fibres. The liquid retention material may be formed from a polymer or copolymer. In at least one example embodiment, the liquid retention material is a spun polymer.

In at least one example embodiment, the storage container or cap holds a capillary material for transporting liquid aerosol-forming substrate to the heating element. The capillary material may be provided in contact with the heating element. In at least one example embodiment, the capillary material is arranged between the heating element and the retention material.

The capillary material may be made of a material that maintains the liquid aerosol-forming substrate in contact with at least a portion of the surface of the heating element. The capillary material may extend into interstices between the filaments. The heating element may draw liquid aerosol-forming substrate into the interstices by capillary action.

A capillary material is a material that actively conveys liquid from one end of the material to another. The capillary material may have a fibrous or spongy structure. The capillary material comprises a bundle of capillaries. For example, the capillary material may comprise a plurality of fibres or threads or other fine bore tubes. The fibres or threads may be generally aligned to convey liquid aerosol-forming substrate towards the heating element. Alternatively, the capillary material may comprise sponge-like or foam-like material. The structure of the capillary material forms a plurality of small bores or tubes, through which the liquid aerosol-forming substrate can be transported by capillary action. The capillary material may comprise any suitable material or combination of materials. Examples of suitable materials are a sponge or foam material, ceramic- or graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, nylon fibres or ceramic. The capillary material may have any suitable capillarity and porosity so as to be used with different liquid physical properties. The liquid aerosol-forming substrate has physical properties, including but not limited to viscosity, surface tension, density, thermal conductivity, boiling point and vapour pressure, which allow the liquid aerosol-forming substrate to be transported through the capillary medium by capillary action.

The heating element may have at least two electrically conductive contact pads. The electrically conductive contact pads may be positioned at an edge area of the heating element. In at least one example embodiment, the at least two electrically conductive contact pads may be positioned on extremities of the heating element. An electrically conductive contact pad may be fixed directly to the electrically conductive filaments. An electrically conductive contact pad may comprise a tin patch. Alternatively, an electrically conductive contact pad may be integral with the electrically conductive filaments.

The cartridge may be a disposable article to be replaced with a new cartridge once the liquid storage portion of the cartridge is empty or the amount of liquid in the cartridge is below a minimum volume threshold. In at least one example embodiment, the cartridge is pre-loaded with liquid aerosol-forming substrate. The cartridge may be refillable.

The aerosol-forming substrate is a substrate that releases volatile compounds that can form an aerosol. The volatile compounds may be released by heating the aerosol-forming substrate.

The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenized plant-based material. The aerosol-forming substrate may comprise homogenized tobacco material. The aerosol-forming substrate may comprise at least one aerosol-former. The aerosol-forming substrate may comprise other additives and ingredients, such as flavourants.

At least one example embodiment relates to an aerosol-generating system comprising a cartridge and a device portion comprising a power supply and control electronics. The cartridge is configured to connect to the device portion. When the cartridge is connected to the device portion, the fluid permeable heater element may be electrically connected to the power supply.

The device portion may comprise a connecting portion for engagement with a corresponding connecting portion on the cartridge.

The device portion may comprise at least one electrical contact element configured to provide an electrical connection to the heating element when the device portion is connected to the cartridge. The electrical contact element may extend through a contact opening in the protective cover. The electrical contact element may be elongate. The electrical contact element may be spring-loaded. The electrical contact element may contact an electrical contact pad in the cartridge.

The power supply is a battery, such as a lithium ion battery. In at least one example embodiment, the power supply may be another form of charge storage device such as a capacitor. The power supply may require recharging. In at least one example embodiment, the power supply may have sufficient capacity to allow for the continuous generation of aerosol for a period of about six minutes or for a period that is a multiple of six minutes. In another example embodiment, the power supply may have sufficient capacity to allow for a desired (or, alternatively predetermined) number of puffs or discrete activations of the heater assembly.

The control electronics may comprise a microcontroller. The microcontroller is a programmable microcontroller. The electric circuitry may comprise further electronic components. The electric circuitry may be configured to regulate a supply of power to the heater assembly. Power may be supplied to the heater assembly continuously following activation of the system or may be supplied intermittently, such as on a puff-by-puff basis. The power may be supplied to the heater assembly in the form of pulses of electrical current.

In at least one example embodiment, the aerosol-generating system is a handheld system. In at least one example embodiment, the aerosol-generating system is portable. The aerosol-generating system may have a size comparable to a cigar or cigarette. The aerosol-generating system may have a total length ranging from about 30 millimetres to about 150 millimetres. The aerosol-generating system may have an external diameter ranging from about 5 millimetres to about 30 millimetres.

Features described with reference to one example embodiment may be applied to other example embodiments.

Figure 2:
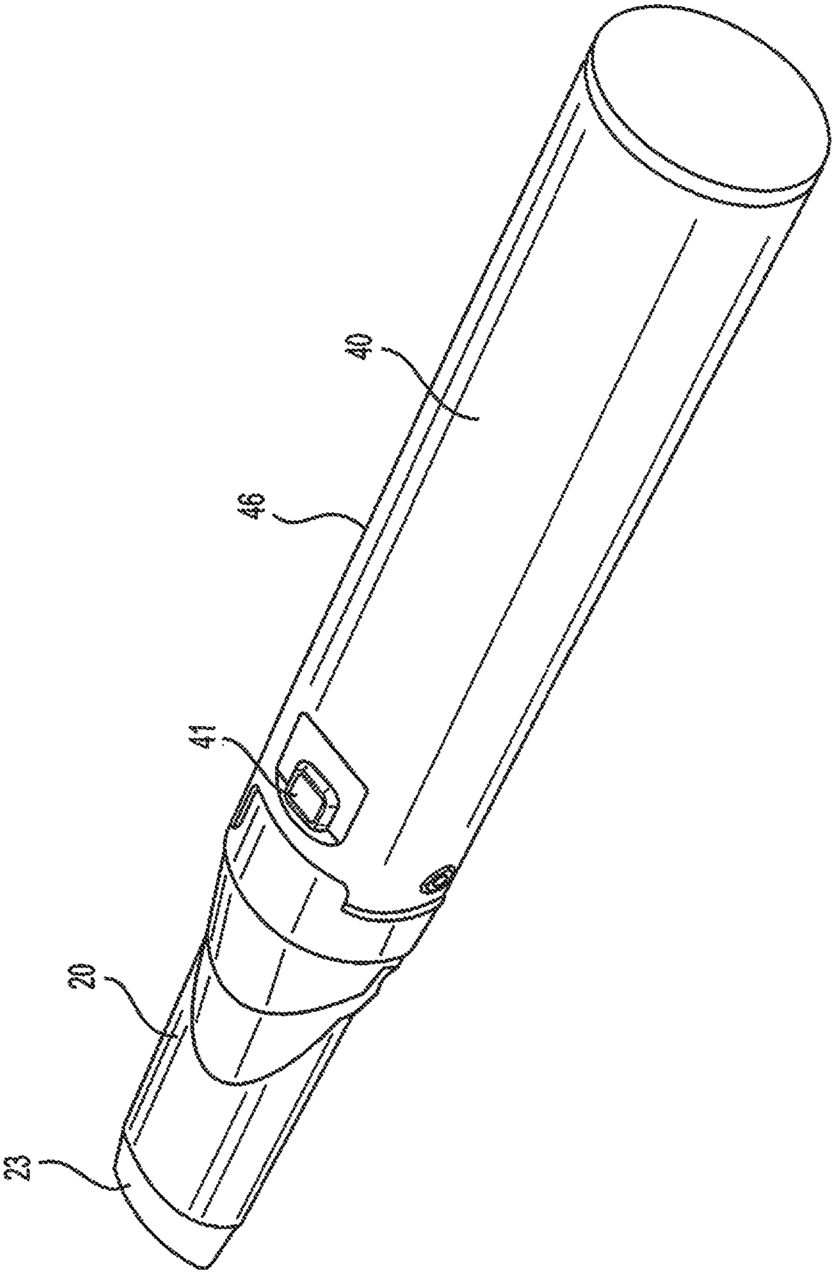
FIG. 2 is a perspective view of the system of FIG. 1 according to at least one example embodiment.

FIG. 1 is a simplified cross-section of an aerosol-generating system 10 in accordance with at least one example embodiment. FIG. 2 is a perspective view of the system shown in FIG. 1. FIG. 3*a* is a perspective view of the cartridge separated from the device portion. FIG. 3*b* is a perspective view of the device portion separated from the cartridge. The system of FIG. 1 comprises a cartridge 20 and a device portion 40 that are coupled together.

The cartridge comprises a supply of liquid aerosol-forming substrate and heater assembly. The device portion comprises a power supply and control circuitry. The device portion functions to supply electrical power to the heater assembly in the cartridge in order to vapourise the liquid aerosol-forming substrate. The vapourised aerosol-forming substrate is entrained in an airflow through the system, the airflow resulting from a puff or draw on a mouthpiece of the cartridge. The vapourised aerosol-forming substrate cools in the airflow to form an aerosol.

The device portion 40 comprises a housing 46, holding a lithium ion battery 42 and control circuitry 44. The device portion also comprises spring loaded electrical contact elements 45, shown in FIG. 3*b*, configured to extend through contact openings 39 and contact electrical contact pads on the heater assembly 28 in the cartridge 20. A button 41 is provided, that actuates a switch in the control circuitry to activate the device. When the device is activated, the control circuitry 44 supplies power from the battery 42 to the heater in the cartridge. The control circuitry 44 may be configured to control the supply of power to the heater after activation in many different ways, as is known in the art. In at least one example embodiment, the control circuitry 44 may be configured to control the power supplied to the heater based on one or more of: a temperature of the heater, a detected airflow through the system, a time following activation, a determined or estimated liquid amount in the cartridge, an identity of the cartridge, and ambient conditions.

The cartridge 20 has a mouthpiece end, comprising a mouthpiece 23. The mouthpiece end is remote from the device portion. A device end 36 of the cartridge is proximate to the device portion.

FIG. 4 is an exploded view of a cartridge of the type shown in FIG. 3*a*. The cartridge 20 comprises a housing 22. Within the housing 22 there is a storage container 24 holding a liquid aerosol-forming substrate 26, shown in FIG. 1. The storage container 24 is open at the device end 36. A heater assembly 28, comprising a flat mesh heating element, is held on a heater cap 30. The heater cap 30 is fitted onto the open end of the storage container 24. A liquid retention material 32 is positioned within the heater cap 30. A capillary material 31, shown in the exploded view of FIG. 4, is positioned between the heater assembly 28 and the liquid retention material 32. A protective cover 33 is fitted to the housing and retains the heater assembly 28 and heater cap 30 to the storage container 24. The protective cover 33 also covers the heating element and protects it from damage.

The protective cover 33 is shown more clearly in FIG. 5. The protective cover 33 has a cap portion with a front wall 500 that covers the heater assembly 28. Contact openings 39 are formed in the front wall 500 and positioned to receive the spring loaded electrical contact elements 45 shown in FIG. 3*b*. Air inlet holes 37 are also formed in the front wall 500. Dilution air inlets 50 are formed in a side wall 505 to provide additional air to mix with vapour from the heater assembly 28, as will be described with reference to FIG. 6. The protective cover 33 also comprises arms 35 that extend around the storage container 24 within the cartridge 20. A portion of the airflow path within the cartridge 20 is defined between the arms 35 and a wall of the storage container 24.

The protective cover 33 is held in position by a snap fitting engagement with the cartridge housing 22. A rib 34 extends around the cap portion of the protective cover and engages a corresponding recess in the cartridge housing 22. In this position the protective cover 33 also presses against a portion of the heater assembly 28 to retain the heater assembly 28 and heater cap 30 over the open end of the storage container 24.

The heater cap 30 has an opening formed in a front face and the heater assembly 28 extends across the opening. The heater assembly 28 comprises a pair of electrical contact pads fixed to the heater cap and heating element, comprising a mesh of electrically conductive heater filaments spanning the opening and fixed to the electrical contacts on opposite sides of the opening. A heater assembly of this type is described in WO2015/117702, the entire content of which is incorporated herein by reference thereto.

As can be seen from FIG. 1, when the protective cover 33 is in position in the cartridge 20, the protective cover 33 presses against the periphery of the heater assembly 28, but does not contact the heating element. An airflow path to and from the heating element is provided between the protective cover 33 and the heater assembly 28 and storage container 24, as will be described in more detail with reference to FIG. 6.

The protective cover 33 is shaped to provide a barrier between the airflow path past the heating element and the electrical contact pads. The protective cover 33 contacts the heater assembly 28 between the exposed portion of the contact pads and the central portion of the heating element to provide this barrier and to secure the heater assembly to the storage container 24. This arrangement reduces the possibility of leaked or condensed liquid aerosol-forming substrate contaminating the contact surfaces of the electrical contact pads and electrical contact elements. In addition, to further reduce the possibility of leaked or condensed liquid from within the airflow path escaping and contaminating other components of the system, a layer of liquid retention material (not shown in the figures) may be provided on the interior of the protective cover or on the exterior of the storage container, to absorb liquid that has condensed within the airflow path.

The cartridge 20 is coupled to the device portion 40 by a push fitting. The cartridge housing 22 is shaped to allow the cartridge 20 to couple to the device portion 40 in only two orientations, ensuring that the spring loaded electrical contact elements 45 are received in the openings 39 and contact the contact pads of the heater assembly 28. A connecting rib 48 of the device portion 40 engages a recess 25 on the cartridge housing 22 to retain the cartridge 20 and device portion 40 together.

The cartridge housing 22 and storage container 24 are moulded in one piece and formed from polypropylene. The liquid retention material 32 is formed from a polypropylene PET copolymer. The capillary material 31 is formed from glass fibre. The heater cap is formed from polyetheretherketone (PEEK). The heating element is formed from stainless steel and the electrical contact pads are formed from tin. The protective cover 33 is formed from liquid crystal polymer (LCP).

The liquid aerosol-forming substrate 26 in this example comprises about 39% by weight glycerine, about 39% by weight propylene glycol, about 20% by weight water and flavourings, and about 2% by weight nicotine. It is of course possible to use other substrates. The aerosol-forming substrate need not be a liquid substrate, but may be a solid substrate instead.

To assemble the cartridge 20 the storage container 24 is first filled with the aerosol-forming substrate. The liquid retention material 32 is then placed into the open end of the storage container 24 and the capillary material 31 placed on the liquid retention material. The heater cap 30, to which the heater assembly 28 is already fixed, is then placed in the open end of the storage container 24. The storage container 24 and heater cap 30 may comprise keying features to ensure the heater cap 30 is place in the correct orientation on the storage container 24. The protective cover 33 is then fitted to the housing 22 to retain all of the cartridge components in position.

The system is a handheld system, sized to fit comfortably in a person's hand. In operation, after the cartridge and device portion have been coupled together, the button 41 is pressed to activate the device. Then a puff is drawn on the mouthpiece 23 to draw air through the system. The control circuitry 44 may supply power to the heater assembly 28 based on detected puffs or may supply power continuously after activation of the device. The heating element is heated to a temperature sufficient to vapourise aerosol-forming substrate in the vicinity of the heating element. The vapourised aerosol-forming substrate passes through the heating element and into the airflow passing through the system.

FIG. 6 illustrates the airflow through the cartridge when a puff is taken on the mouthpiece 23. Air is drawn into the system through inlets 60 formed between the housing of the device body and the housing 22 of the cartridge 20. The air then passes through apertures 62 formed in a connection portion of the device portion and into a cavity formed between the device portion and the protective cover 33. The air is then drawn into the cartridge both through the air inlet holes 37 on the front wall of the protective cover and through the dilution air inlets 50. Air drawn through the air inlet holes 37 impinges onto the heating element and entrains vapourised aerosol-forming substrate. The mixture of air and vapour is drawn away from the heating element along an airflow path 54 between the protective cover 33 and the storage container 24. Air drawn in through dilution air inlets 50 mixes with the vapour/air mixture from the heater assembly. As the mixture is travelling through the airflow path 54 the vapour cools and an aerosol is formed. This aerosol exits the device through the mouthpiece 23.

The airflow path includes a 90 degree bend, following the exterior of the storage container. Any large liquid droplets or debris in the airflow will not pass around the bend but will hit the protective cover 33.

FIG. 7 illustrates the airflow in an alternative example embodiment. In the example embodiment of FIG. 7 the protective cover 33 is modified to have different air inlets and to block airflow reaching the mouthpiece without first passing the heating element. The airflow also includes a sharp bend. The bend may be substantially U-shaped, following the exterior surface of the storage container. There are no air inlets in the front wall of the protective cover 33, only inlet 75, which may be in the position of the dilution air inlets 50 shown in FIG. 6. The protective cover 73 of FIG. 7 has the same overall shape as the protective cover 33 of FIG. 6. The air is drawn into the cartridge through the inlet 75. A protrusion 77 substantially prevents (or reduces) the air going straight to the mouthpiece 33 and directs it to the heating element. The protrusion 77 may be moulded to prevent and/or reduce any significant volume of air from the inlet 75 flowing to the mouthpiece outlet that does not first pass the heating element. The air passes across the heating element 28 and entrains vapourised aerosol-forming substrate. The mixture of air and vapour is drawn away from the heating element along an airflow path 79 between the protective cover 73 and the storage container 24. As the mixture is travelling through the airflow path 79 the vapour cools and an aerosol is formed.

The cartridges described with reference to the figures can be easily manufactured and assembly. The cartridges are robust and the heating element is protected from damage during transport and handling. The cartridges allow for simple and direct electrical connection to be made from a device portion of the system to the heater assembly in the cartridge.

The example embodiments described above illustrate but are not limiting. In view of the above discussed example embodiments, other example embodiments consistent with the above example embodiments will now be apparent to one of ordinary skill in the art.

We claim:

1. A cartridge for an electronic vaping device, comprising:
- a storage container configured to contain a supply of a vapor-forming substrate;
- a fluid permeable heating element at an opening of the storage container;
- a protective cover coupled to the storage container and configured to cover the fluid permeable heating element;
- an air inlet in a sidewall of the protective cover; and
- a protrusion extending from the sidewall of the protective cover, the protrusion configured to at least partially define an airflow path, the airflow path extending from the air inlet to the fluid permeable heating element and between the protective cover and the storage container to a mouthpiece including at least one air outlet.

2. The cartridge of claim 1, wherein the airflow path comprises a sharp bend following an exterior surface of the storage container from the air inlet.

3. The cartridge of claim 1, wherein the airflow path is U-shaped.

4. The cartridge according to claim 1, wherein the protective cover forms part of an external surface of the cartridge.

5. The cartridge according to claim 1, further comprising:
- a device end configured to connect to a device portion; and
- a mouthpiece end opposite the device end, the protective cover being at the device end of the cartridge.

6. The cartridge according to claim 5, wherein the protective cover is between the device portion and the fluid permeable heating element when the cartridge is connected to the device portion.

7. The cartridge according to claim 5, wherein the protective cover at least partially extends into the device portion when connected thereto.

8. The cartridge according to claim 1, wherein the protective cover is coupled to at least one of an external housing of the cartridge or the storage container.

9. The cartridge according to claim 1, wherein the protective cover retains the fluid permeable heating element adjacent to the storage container.

10. The cartridge of claim 1, further comprising:
- a heater cap adjacent the storage container;
- a liquid retention material within the heater cap and in fluid communication with the vapor-forming substrate; and
- a capillary material within the heater cap and in fluid communication with the liquid retention material,
- wherein the fluid permeable heating element is supported by the heater cap and in contact with the capillary material, and
- wherein the protective cover is configured to cover at least a portion of the heater cap.

11. An aerosol-generating system, comprising:
- a cartridge including,
  - a storage container configured to contain a supply of a vapor-forming substrate,
  - a fluid permeable heating element at an opening of the storage container,
  - a protective cover coupled to the storage container and configured to cover the fluid permeable heating element,
  - an air inlet in a sidewall of the protective cover, and
  - a protrusion extending from the sidewall of the protective cover, the protrusion configured to at least partially define an airflow path from the air inlet to the fluid permeable heating element, the airflow path extending between the protective cover and the storage container to a mouthpiece including at least one air outlet; and
- a device portion including,
  - a power supply,
  - the cartridge configured to connect to the device portion, and when the cartridge is connected to the device portion, the fluid permeable heating element is electrically connected to the power supply.

12. The system of claim 11, wherein the airflow path comprises a sharp bend following an exterior surface of the storage container from the air inlet.

13. The system of claim 11, wherein the airflow path is U-shaped.

14. The system of claim 11, wherein the cartridge further comprises:

a heater cap adjacent the storage container;

a liquid retention material within the heater cap and in fluid communication with the vapor-forming substrate; and a capillary material within the heater cap and in fluid communication with the liquid retention material;

wherein the fluid permeable heating element is supported by the heater cap and in contact with the capillary material, and wherein the protective cover is configured to cover at least a portion of the heater cap.

15. The system of claim 11, wherein the protective cover forms part of an external surface of the cartridge.

16. The system of claim 11, further comprising:

a device end configured to connect to the device portion; and a mouthpiece end opposite the device end, the protective cover being at the device end of the cartridge.

17. The system of claim 16, wherein the protective cover is between the device portion and the fluid permeable heating element when the cartridge is connected to the device portion.

18. The system of claim 11, wherein the protective cover at least partially extends into the device portion when connected thereto.

19. The system of claim 11, wherein the protective cover is coupled to at least one of an external housing of the cartridge or the storage container.

20. The system according to claim 11, wherein the system is a handheld aerosol-generating system.

* * * * *